United States Patent
Jaaskelainen et al.

(12) 
(10) Patent No.: US 12,203,798 B2
(45) Date of Patent: Jan. 21, 2025

(54) DETERMINING ORIENTATION OF A SUBSURFACE FLOW METER DEVICE

(71) Applicant: Halliburton Energy Services, Inc., Houston, TX (US)

(72) Inventors: Mikko K. Jaaskelainen, Katy, TX (US); Julian Drew, Centennial, CO (US); Barry Fish, Denver, CO (US)

(73) Assignee: Halliburton Energy Services, Inc., Houston, TX (US)

( * ) Notice: Subject to any disclaimer, the term of this patent is extended or adjusted under 35 U.S.C. 154(b) by 354 days.

(21) Appl. No.: 17/832,432

(22) Filed: Jun. 3, 2022

(65) Prior Publication Data
US 2023/0392971 A1    Dec. 7, 2023

(51) Int. Cl.
*G01F 25/10*     (2022.01)
*G01F 1/667*     (2022.01)
*G01F 1/74*      (2006.01)

(52) U.S. Cl.
CPC .............. *G01F 25/10* (2022.01); *G01F 1/667* (2013.01); *G01F 1/74* (2013.01)

(58) Field of Classification Search
CPC . G01F 25/10; G01F 1/667; G01F 1/74; G01F 1/666; G01F 1/86; E21B 47/107; G06N 20/00
See application file for complete search history.

(56) References Cited

U.S. PATENT DOCUMENTS

| | | | |
|---|---|---|---|
| 8,490,693 B2 * | 7/2013 | Birchwood | G01V 1/50 166/250.1 |
| 2005/0011645 A1 * | 1/2005 | Aronstam | E21B 47/138 166/250.11 |
| 2017/0205260 A1 * | 7/2017 | Jaaskelainen | G01H 9/004 |

OTHER PUBLICATIONS

Halliburton Energy Services, Inc., unpublished U.S. Appl. No. 63/263,89, filed Feb. 18, 2022, In accordance with the waiver of the Copy Requirements in 37 CFR 1.98, for cited pending U.S. Patent applications, 1287 O.G. 163 (Oct. 19, 2004).

* cited by examiner

*Primary Examiner* — Tung S Lau
(74) *Attorney, Agent, or Firm* — Kilpatrick Townsend & Stockton LLP

(57) ABSTRACT

A system for making multi-phase measurements of a fluid includes a flow meter device and a computing device. The flow meter device can include one or more acoustic devices that can generate acoustic signals in a wellbore. The computing device can receive acoustic signals from the flow meter device and determine an arrangement of the one or more acoustic devices with respect to the wellbore. The computing device can interpret the acoustic signals using the determined arrangement of the one or more acoustic devices to make a multi-phase measurement of fluid with respect to the wellbore.

19 Claims, 9 Drawing Sheets

DETERMINING ORIENTATION OF A SUBSURFACE FLOW METER DEVICE

TECHNICAL FIELD

The present disclosure relates generally to wellbore operations and, more particularly (although not necessarily exclusively), to determining an orientation of a flow meter device in a wellbore.

BACKGROUND

A wellbore can be formed in a subterranean formation or a sub-oceanic formation for extracting produced hydrocarbon material. Fluid can be produced from the wellbore. The fluid can include oil, water, gas, other suitable material from the formation, or any combination thereof. Measurements with respect to the fluid can be made to determine information about the fluid. The information can include properties, such as fluid density, amounts of each phase of the fluid, flow rate, and the like. But, measuring phase-specific information relating to the fluid can be difficult. For example, the combination of phases of the fluid may render the measurements difficult to interpret, etc.

DETAILED DESCRIPTION

Figure 1:
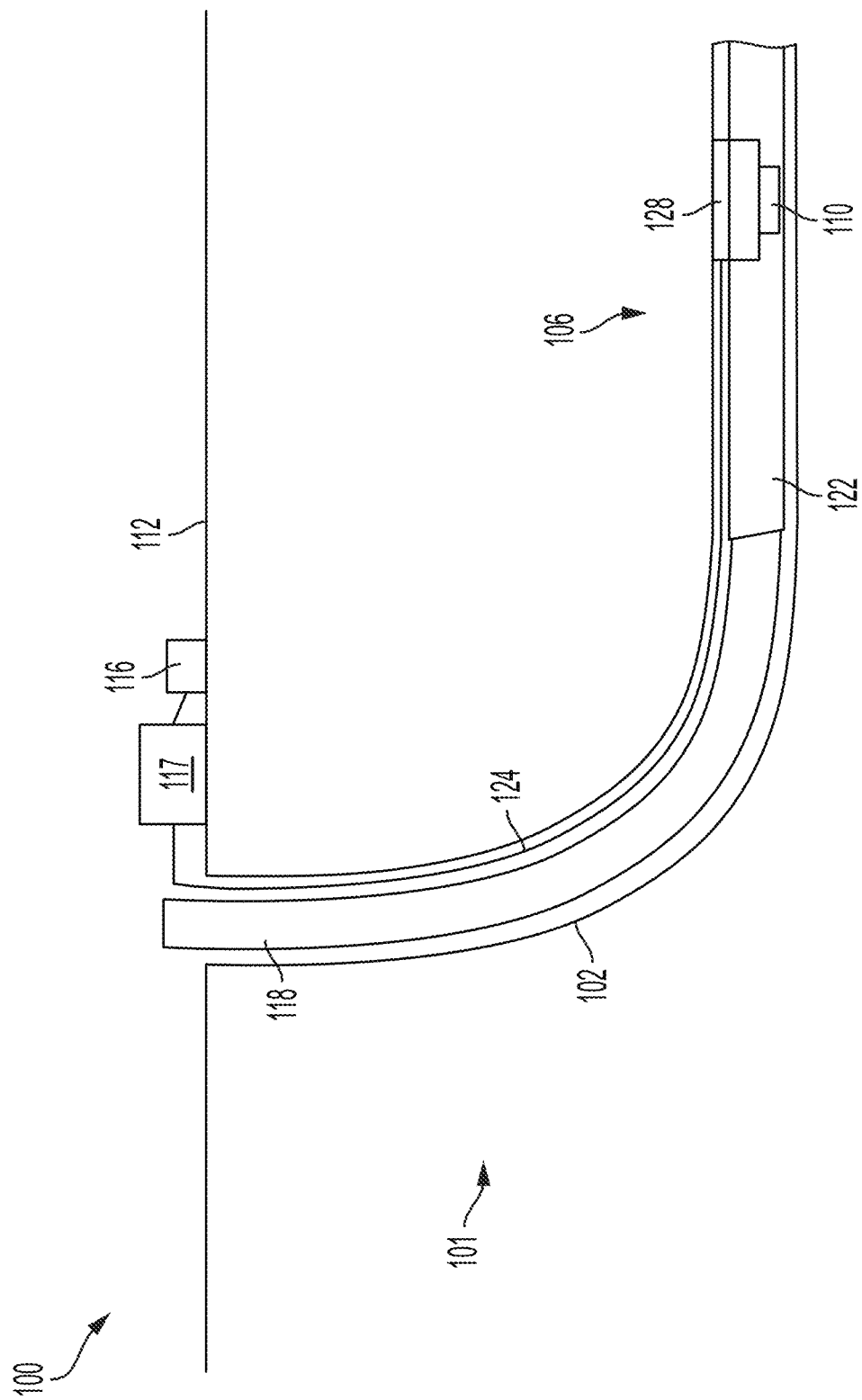
FIG. 1 is a schematic of an example of a wellbore with components for measuring multi-phase measurements of fluid in a wellbore according to one example of the present disclosure.

Certain aspects and examples of the present disclosure relate to determining an orientation of a multi-phase flow meter device in a wellbore to make multi-phase measurements of fluid from the wellbore. In a multi-phase fluid, various phases can co-mingle. For example, the multi-phase measurements can include oil, water, gas, other suitable phases, or a combination thereof. The multi-phase measurements of the fluid can include viscosities, individual flow rates, and the like of constituent phases in fluid flow. Additionally, multi-phase measurements can identify the types of phases and phase ratios of the multi-phase fluid. For example, the flow meter device may include one or more acoustic devices or other suitable devices that can be used to make multi-phase measurements. The orientation of the flow meter device may involve an orientation or arrangement of the one or more acoustic devices with respect to the flow meter device. Determining the orientation of the flow meter device can improve efficiency, accuracy, or a combination thereof of the multi-phase measurements.

A flow meter device can be used to determine multi-phase measurements of the fluid. The flow meter device can include an arrangement of one or more acoustic devices. The orientation of the multi-phase flow meter device can indicate an alignment of the acoustic devices with respect to the other acoustic devices of the flow meter device, etc. An optimal arrangement or known arrangement of acoustic devices can simplify analyses of signals generated by the flow meter device. The optimal arrangement or known arrangement can lead to better resolution of fluid type and multi-phase flow rates compared to other arrangements that do not include the optimal arrangement or the known arrangement. Additionally, a known, fixed arrangement of the acoustic devices can minimize the number of acoustic devices needed for resolving multi-phase fluid flow. Frequency shifts due to differences in fluid properties may not result in a crossing or overlap of frequencies associated with individual acoustic devices using the known arrangement. An acoustic device can be designed with a frequency that is closer to the frequencies of other acoustic devices in the known arrangement, and harmonics can be less likely to interfere with or otherwise complicate analysis of a signal. With closer frequency spacing between acoustic devices, more discrete frequencies can be employed with respect to the acoustic devices, and using discrete frequencies can lead to greater accuracy.

Orientation devices and sensors can be used to more accurately determine the orientation of the flow meter device before, during, or after deployment of the flow meter device in the wellbore. Determining the orientation can remove limitations with respect to a choice of signal frequencies and to an arrangement of acoustic devices. Analysis and interpretation of acoustic signals or other suitable signals using the determined orientation can be simplified and can be more accurate compared to analyses or interpretations that do not involve known orientations.

The orientation can be determined by various techniques. For example, an orientation detection device can be included in the flow meter device. The orientation detection device can include a three-dimensional accelerometer or other suitable orientation device, and the orientation detection device can be positioned in a center borehole or other suitable location with respect to the orientation detection device. In some examples, the orientation sensor can include 3D accelerometer and a temperature sensor and can be co-located with an optical fiber cable, or other suitable sensing device, as the optical fiber cable is run into the wellbore. The orientation can be measured using the orientation detection device with one or more sensors, such as an electrical sensor, etc., and signals from the one or more sensors can be amplified and acoustically transmitted to a computing device at the surface or other suitable location with respect to the wellbore. The acoustic transmission may be determined by the computing device using a surface detection system such as a distributed acoustic sensing (DAS) system, or the like. Accordingly, the orientation of the flow meter device can be measured or monitored after the flow meter device is deployed in the wellbore.

In another technique for determining an orientation of the flow meter device, the orientation detection device can be positioned with respect to a deployment string such that the orientation of the flow meter device can be determined when the flow meter device is released. The deployment string can include a coil, wireline assembly, stringline, etc. The flow meter device may be anchored on or otherwise with respect to the deployment string at or otherwise during the time the flow meter device is released or deployed in the wellbore. The orientation detection device can make real-time orientation measurements. Additionally or alternatively, the orientation detection device can make orientation measurements that can be transmitted to and stored in a memory tool. The flow meter device can be actively oriented prior to release in the wellbore. For example, while being deployed in the wellbore and before detaching from the deployment string, an orientation of the flow meter device can be adjusted. Prior to, or during, the release of the flow meter device, the orientation detection device, which can be included in the deployment tool or the flow meter device, can measure the orientation of the flow meter device and transmit the orientation information to the computing device.

In another technique for determining an orientation of the flow meter device, the flow meter device can be automatically oriented in such a way that acoustic devices included in the flow meter device can include an optimal arrangement. The flow meter device can be positioned in a housing that can couple to the inside of a casing or a tubing of the wellbore. The flow meter device, or the acoustic devices thereof, can rotate or otherwise align within the housing using gravitational force. For example, bearings positioned between the flow meter device and the housing can allow the flow meter device to rotate to align the acoustic devices in a predetermined orientation during or subsequent to being deployed in the wellbore. The flow meter device can be fixed during deployment in the wellbore by mechanical stoppers that dissolve in the presence of wellbore fluids.

In some examples, the flow meter device can be latched to a wellbore surface or wall during deployment of the flow meter device. The flow meter device can be latched to the wellbore surface or wall using a locking mechanism or other suitable latching mechanism. The locking mechanism can include an orientation mechanism that can facilitate orientation measurement with respect to the flow meter device. Latching the flow meter device can fix and maintain the orientation of the flow meter device before deployment, during deployment, after deployment, or any suitable combination thereof.

Illustrative examples are given to introduce the reader to the general subject matter discussed herein and are not intended to limit the scope of the disclosed concepts. The following sections describe various additional features and examples with reference to the drawings in which like numerals indicate like elements, and directional descriptions are used to describe the illustrative aspects, but, like the illustrative aspects, should not be used to limit the present disclosure.

FIG. 1 is a schematic of an example of a wellbore system 100 for making multi-phase measurements of fluid in a wellbore 102 according to one example of the present disclosure. In some examples, the wellbore system 100 is illustrated for a wellbore 102, such as an oil or gas wellbore, for extracting fluids from a subterranean formation 101. For example, the wellbore 102 can be used to extract water, oil, gas, other suitable fluid or material, or any combination thereof from the subterranean formation 101. As illustrated, the wellbore 102 is formed in the subterranean formation 101, but the wellbore 102 can be formed in a sub-oceanic formation or in other suitable locations. The wellbore 102 can include a casing 118 or other suitable component for allowing produced fluid, such as multi-phase fluid, to be extracted from the wellbore 102.

The wellbore system 100 can include a flow meter device 128 and a well tool or downhole tool 122. The downhole tool 122 can be any suitable tool used to gather information about the wellbore 102. For example, the downhole tool 122 can be a tool delivered downhole by wireline to perform operations such as wireline formation testing. Alternatively, the downhole tool 122 can include a completion tool, a stimulation tool, etc. In some examples, the downhole tool 122 can be used to deploy the flow meter device 128 in the wellbore 102. Additionally or alternatively, the downhole tool 122 can be, can include, or can be communicatively coupled to a sensing system 117, such as a DAS system, that can be used to receive acoustic signals generated by the flow meter device 128.

The sensing system 117 may include one or more fiber optic cables cemented in place in the annular space between the casing 118 and the subterranean formation 101. The sensing system 117 may be interrogated to measure signals generated by the acoustic devices 110 such as fluidic oscillators. The sensing system 117 may be clamped to the outside of the casing 118 during the deployment and protected by centralizers or cross coupling clamps during run-in-hole. Other applications include tubing-conveyed cables or retrievable sensing cables like wireline and slickline, or cables deployed inside coiled tubing. The sensing system 117 may also be deployed in the wellbore 102 using gravity such that a weight or conveyance vehicle is dropped into the wellbore 102, and the sensing system 117 is released in the wellbore 102 as the deployment vehicle proceeds in the wellbore 102. The sensing system 117 may be payed out from the surface or from a coil in the deployment vehicle.

Other examples of the sensing system 117 may include point sensors either at the surface, down-hole, or a combination thereof. In some examples, single-point or multi-point pressure or temperature sensors can be used in reservoir monitoring applications in which the pressure sensors may collect data at rates up to 2,000 Hz or even higher.

The sensing system 117 may house one or more optical fibers, and the optical fibers may be single-mode fibers, multi-mode fibers, or a combination thereof. The sensing system 117 connected to the optical fibers may include distributed temperature sensing (DTS) systems, DAS systems, distributed strain sensing (DSS) systems, quasi-distributed sensing systems in which multiple single-point sensors are distributed along an optical fiber or cable, or single-point sensing systems in which the sensors are located at the end of the cable.

The sensing system 117 may operate using various sensing principles, such as Rayleigh scattering, Brillouin scattering, and Raman scattering. For example, the sensing principles can include (i) amplitude-based sensing systems, such as DTS systems based on Raman scattering, and (ii) phase-sensing-based systems, such as DAS systems based on interferometric sensing using homodyne or heterodyne techniques in which the system may sense phase or intensity changes due to constructive or destructive interference. The sensing principles can additionally include (iii) strain-sensing systems like DSS using dynamic strain measurements based on interferometric sensors or static strain sensing measurements using Brillouin scattering, quasi-distributed sensors based on Fiber Bragg Gratings (FBGs) in which a wavelength shift is detected, etc. In some examples, multiple FBGs can be used to form Fabry-Perot-type interferometric sensors for phase-based or intensity-based sensing.

True, distributed fiber-optic-sensing systems, such as one example of the sensing system 117, may operate using optical time domain reflectometry principles or optical frequency domain reflectometry. Optical time domain reflectometry-based systems can be pulsed such that one or more optical pulses may be transmitted down an optical fiber of the sensing system 117 and backscattered light, such as Rayleigh, Brillouin, Raman, etc., can be measured and processed. Time of flight for the optical pulses can indicate a location along the optical fiber the measurement is made. Optical frequency domain reflectometry-based systems can operate in a continuous-wave mode in which a tunable laser is swept across a wavelength range, and the back scattered light is collected and processed.

Various hybrid approaches, in which single-point, quasi-distributed, or distributed fiber optic sensors of the sensing system 117 can be mixed with electrical sensors, can be used. The sensing system 117 may include optical fiber and electrical conductors. Electrical sensors may be pressure sensors based on quartz-type sensors, strain-gauge-based sensors, etc. Pressure sensors, optical sensors, or electrical sensors may be housed in dedicated gauge mandrels or attached outside the casing 118 in some examples for down-hole deployment or for conventional deployment at the surface of the wellbore 102.

Temperature measurements from a DTS system may be used to determine locations for water injection applications where fluid inflow in the treatment well as the fluids from the surface may be cooler than formation temperatures. Temperature measurements in observation wells can be used to determine fluid communication between the treatment well and observation well, or to determine formation fluid movement. DAS data can be used to determine fluid allocation in real-time as acoustic signals are generated when fluid flows, for example through the flow meter device 128. Phase-based and intensity-based interferometric sensing systems can be sensitive to temperature, mechanical vibrations, and acoustically-induced vibrations. DAS data can be converted from time-series data to frequency-domain data using Fast Fourier Transforms and other transforms like wavelet transforms.

Various frequency ranges can be used with respect to the sensing system 117, for example in which low frequency signal changes may be attributed to formation strain changes or temperature changes due to fluid movement, etc. Various filtering techniques and models may be applied to generate indicators of events that may be of interest. Indicators may include formation movement due to growing natural fractures, formation stress changes during the fracturing operations (stress shadowing), etc. Each indicator may include a characteristic signature such as frequency content, amplitude, or time dependent behavior, etc. The indicators may also be present in other data types and may not be limited to DAS data. Fiber optic cables used with DAS systems, such as the sensing system 117, may include enhanced backscatter optical fibers where the Rayleigh backscatter may be increased by 10 times or more with an associated increase in optical signal-to-noise ratio.

DAS systems, such as one example of the sensing system 117, can also be used to detect various seismic events where stress fields or growing fracture networks can generate microseismic events or where perforation charge events may be used to determine travel time between horizontal wells. The detected data can be used to determine changes in travel time as the formation is fractured and filled with fluid, proppant, etc. The DAS systems may also be used with surface seismic sources to generate vertical seismic profiles before, during, and after a fracturing operation to determine the effectiveness of the fracturing operation and to determine production effectiveness and perform other tasks relating to other wellbore operations.

DSS data, such as one example of data generated or detected via the sensing system 117, can be generated using various approaches. Static strain data can be used to determine absolute strain changes over time. Static strain data can be measured using Brillouin-based systems or quasi-distributed strain data. Static strain may be used to determine propped fracture volume by determining deviations in strain data from a measured strain baseline before fracturing a stage. Formation properties, such as permeability, poro-elastic responses, and leak-off rates, can be determined based on the change of strain vs. time and the rate at which the strain changes over time. Dynamic strain data can be used in real-time to detect fracture growth through an appropriate inversion model, and appropriate actions like dynamic changes to fluid flow rates in the treatment well, addition of diverters or chemicals into the fracturing fluid, or changes to proppant concentrations or types can be used.

The sensing system 117 can be placed in either a treatment well or one or more monitoring wells to measure well communication. The treatment well pressure, rate, proppant concentration, diverters, fluids, chemicals, etc. may be altered to control a wellbore operation. The changes may impact the formation responses in various ways. For example, stress fields may change, which may generate microseismic effects that can be measured with DAS systems or single-point seismic sensors like geophones. Additionally, pressure changes due to poro-elastic effects may be measured in the monitoring well. And, pressure data may be measured in the treatment well and correlated to formation responses.

The downhole tool 122 can include a sensor component 124 for determining information about the wellbore 102. In some examples, the sensor component 124 can detect acoustic signals. The sensor component 124 may be an electrical sensor or optical sensor, a fiber optic cable, a pressure transducer, or other suitable sensor or detector. The downhole tool 122 can transmit data from the sensor component 124 to a computing device 116 positioned at the surface 109 of the wellbore 102. The sensor component 124 can be communicatively coupled to the computing device 116 via a wired connection, a wireless connection, or a combination thereof. In some examples, the computing device 116 can include a DAS system, a computing system configured to receive, record, or analyze acoustic signals, other suitable detection systems, or any combination thereof.

The flow meter device 128 can be positioned in the wellbore 102 to generate acoustic signals for determining multi-phase fluid measurements of fluid from the wellbore 102. For example, the flow meter device 128 can be affixed to, or otherwise positioned in, the casing 118 of the wellbore 102. As illustrated, the flow meter device 128 is positioned in a substantially horizontal section of the wellbore 102, but the flow meter device 128 can be positioned in any other suitable locations (e.g., at the surface 109, etc.) with respect to the wellbore 102. The fluid can travel through the flow meter device 128, and the flow meter device 128 can generate, or otherwise facilitate any sub-component thereof to generate, acoustic signals proportional to flow rates of respective phases of the multi-phase fluid.

The flow meter device 128 can include one or more acoustic devices 110 such as a fluidic oscillator, a hole-tone whistle, and the like. The fluidic oscillator can be symmetric or asymmetric. The flow meter device 128 can include one, two, three, four, or more acoustic devices. The acoustic devices can generate acoustic waves or other suitable signals with different frequency ranges corresponding to different phases of the fluid. The flow meter device 128 can be oriented such that an arrangement of the acoustic devices is optimized. For example, the orientation of the flow meter device 128 can allow measurement of phase-specific flow rates and other suitable flow characteristic information with optimized efficiency. In examples in which the flow meter device 128 includes two or more acoustic devices 110, the two or more acoustic devices 110 can include the same or similar design or otherwise generate signals in the same or similar frequency range. In some examples, the two or more acoustic devices may include a different design or may otherwise generate signals not in the same or similar frequency range.

The flow meter device 128 can include a number of fluidic oscillators corresponding to an amount of phases included or expected to be in fluid produced via the wellbore 102. For example, if the fluid includes or is expected to include three phases corresponding to oil, gas, and water, then the flow meter device 128 can include three fluidic oscillators to perform a multi-phase measurement of the fluid. In such an example, the three fluidic oscillators may be positioned in different locations (e.g., around a circumference of the flow meter device 128, etc.) with respect to the flow meter device 128. In some examples, the number of fluidic oscillators in the flow meter device 128 may not correspond to the number of phases and can be greater than or less than the number of phases present in the fluid.

Additionally, or alternatively, more than one flow meter device 128 can be included in the wellbore 102 to perform the multi-phase measurement of the fluid. For example, if the fluid includes or is expected to include three phases, then three different flow meter devices can be included in the wellbore 102. The three different flow meter devices can be positioned a minimum distance apart and each may include a different fluidic oscillator for measuring a different phase of the fluid. In some examples, the number of flow meter devices can be greater than or less than the number of phases present in the fluid. Additionally, distributed measurements, such as measurements made using a DAS system, can be made with respect to the flow meter devices 128. The distributed measurements can be used to calculate a distributed flow profile between the flow meter devices.

In some examples, a computing device 116 can be positioned at the surface 109 of, or in other locations such as downhole, remote, etc. with respect to, the wellbore 102. The computing device 116 can be communicatively coupled to other components of the wellbore 102, such as the downhole tool 122, the sensor component 124, etc. The computing device 116 can receive acoustic signals via the other components of the wellbore 102. For example, one or more acoustic devices 110 can generate and propagate acoustic signals based on fluid flowing in the wellbore 102. For example, the frequency of the acoustic signals can correspond to flow properties of the fluid. The acoustic signals can be sensed by the sensor component 124, which can direct the acoustic signals, or any suitable representation thereof, to the computing device 116. For example, the sensing system 117 can convert the acoustic signals to electrical signals or optical signals and can transmit the converted signals to the computing device 116. In some examples, the sensing system 117 can include or otherwise be communicatively coupled to the computing device 116.

The computing device 116 can interpret the converted signals. For example, the computing device can determine, for example via a trained learning model or other suitable software, a type of fluid flowing in the wellbore 102, ratios of phases included in the wellbore 102, one or more flow rates, or any other suitable multi-phase measurements with respect to fluid in the wellbore 102. In some examples, the computing device 116 can receive orientation information from the flow meter device 128, from the downhole tool 122, or from other suitable components of the wellbore 102. The computing device 116 can use the orientation information to interpret the received acoustic signals.

Figure 2:
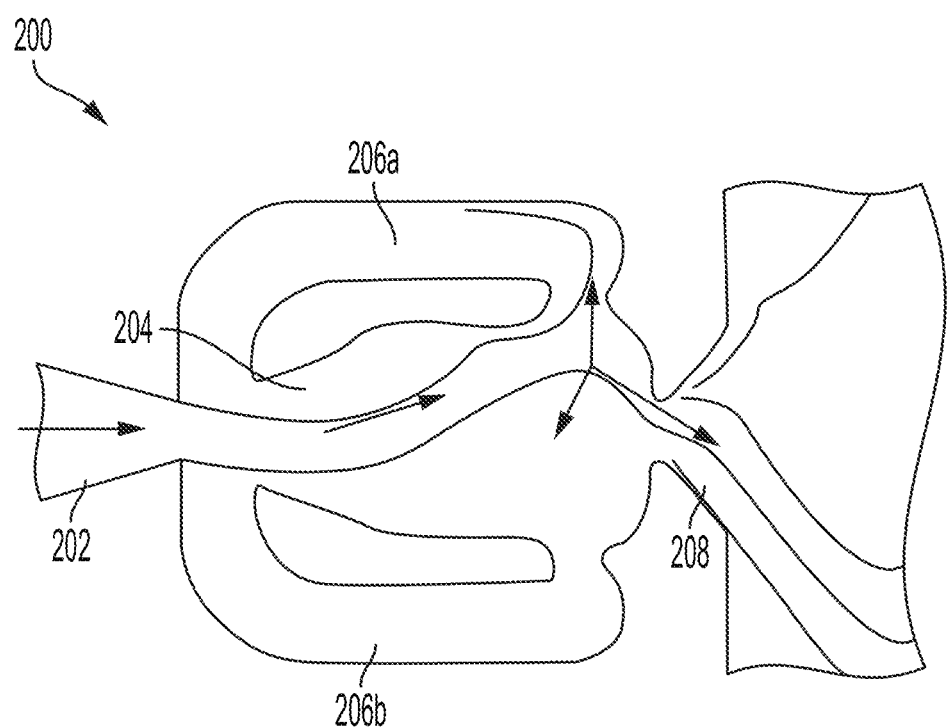
FIG. 2 is a diagram of fluid flow with respect to a fluidic oscillator according to one example of the present disclosure.

FIG. 2 is a diagram of a fluid flow with respect to a fluidic oscillator 200 according to one example of the present disclosure. The fluidic oscillator 200 can be included in the flow meter device 128, for example as the acoustic device 110. The fluidic oscillator 200 can include an inlet channel 202, a mixing chamber 204, feedback loops 206a-b, and an outlet channel 208. The inlet channel 202 may be coupled to the mixing chamber 204, which may be coupled to the feedback loops 206a-b and the outlet channel 208. The fluidic oscillator 200 can include other or different suitable components. Additionally, while illustrated as symmetric, the fluidic oscillator 200 may be asymmetric or otherwise include an asymmetric feature. For example, the outlet channel 208 or other suitable feature of the fluidic oscillator 200 may be asymmetric.

Fluid may be directed into the fluidic oscillator 200 via the inlet channel 202. The fluid may travel into the mixing chamber 204, and the fluid may oscillate. For example, the fluid may oscillate in the mixing chamber 204, by traveling through one or more of the feedback loops 206a-b, by flowing through the outlet channel 208, etc. The frequency of oscillation of the fluid may depend on various factors. For example, the frequency of oscillation of the fluid can be a linear function of the flow rate of the fluid. Additionally or alternatively, the frequency of oscillation of the fluid may depend on a pressure drop, such as the square root of the pressure drop, in the fluidic oscillator 200. The frequency of oscillation may depend on other suitable factors relating to the fluidic oscillator 200. In some examples, the oscillation of the fluid in the fluidic oscillator 200 may cause acoustic signals to be generated or propagated.

Figure 3:
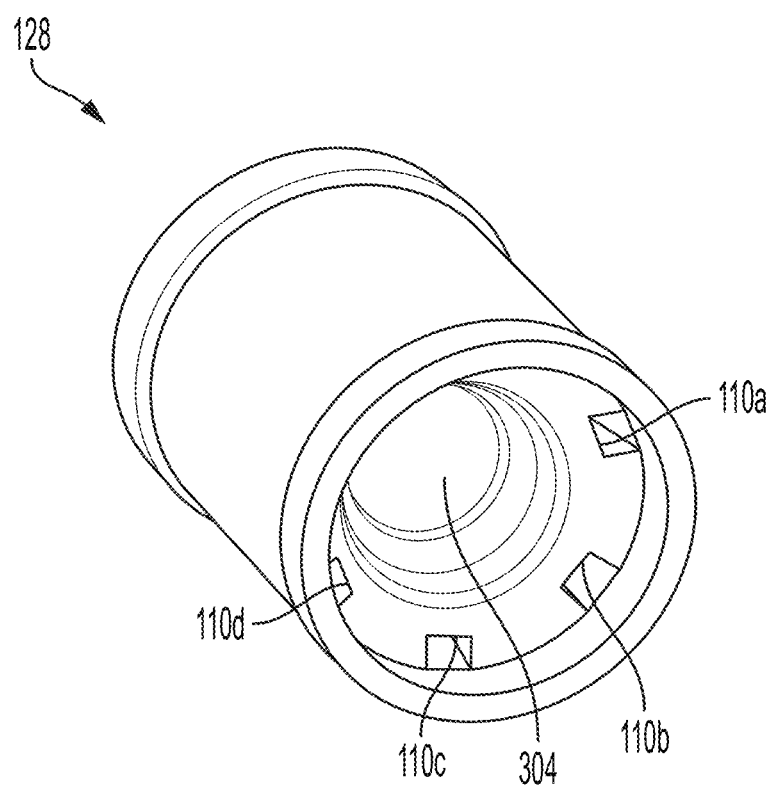
FIG. 3 is a perspective view of a flow meter device according to one example of the present disclosure.

FIG. 3 is a perspective view of a flow meter device 128 according to one example of the present disclosure. The flow meter device 128 can be positioned in the wellbore 102, at the surface 109 of the wellbore 102, or in other suitable locations. In some examples, the flow meter device 128 can be positioned in the casing 118 or other suitable flow lines of the wellbore 102. The flow meter device 128 can be used to determine flow rate and other information relating to fluid flowing with respect to the wellbore 102. The flow meter device 128 can include a set of acoustic devices 110a-d and a bore hole 304. While illustrated with four acoustic device 110a-d, the flow meter device 128 can include other suitable numbers, such as less than four or more than four, of acoustic devices 110. The flow meter device 128 can include any other suitable components.

The flow meter device 128 can include a number of acoustic devices 110 that corresponds to an amount of phases of fluid from the wellbore 102. For example, if the fluid includes four phases, then the flow meter device 128 can include, for example as illustrated, four acoustic devices 110, though the number of acoustic devices 110 in the flow meter device 128 may be greater than or less than four acoustic devices 110. As illustrated, the acoustic devices 110a-d are positioned near the circumference of the flow meter device 128, but the acoustic devices 110a-d can be positioned in other suitable locations with respect to the flow meter device 128. The acoustic devices 110a-d can be positioned to detect or otherwise sense data relating to one or more phases of the fluid. For example, the acoustic device 110a may be positioned to sense data about a gas phase of the fluid, the acoustic device 110b may be positioned to sense data about a combination oil/gas phase of the fluid, the acoustic device 110c may be positioned to sense data about a water phase of the fluid, etc. The bore hole 304 may be positioned in, or approximately in, the center of the flow meter device 128. The size of the bore hole 304, the shape of the bore hole 304, or a combination thereof can be selected based on expected fluid properties, the acoustic device 110 type or placement, desired measurements, other suitable parameters, or any combination thereof. In some examples, the bore hole 304 may be omitted.

Figure 4:
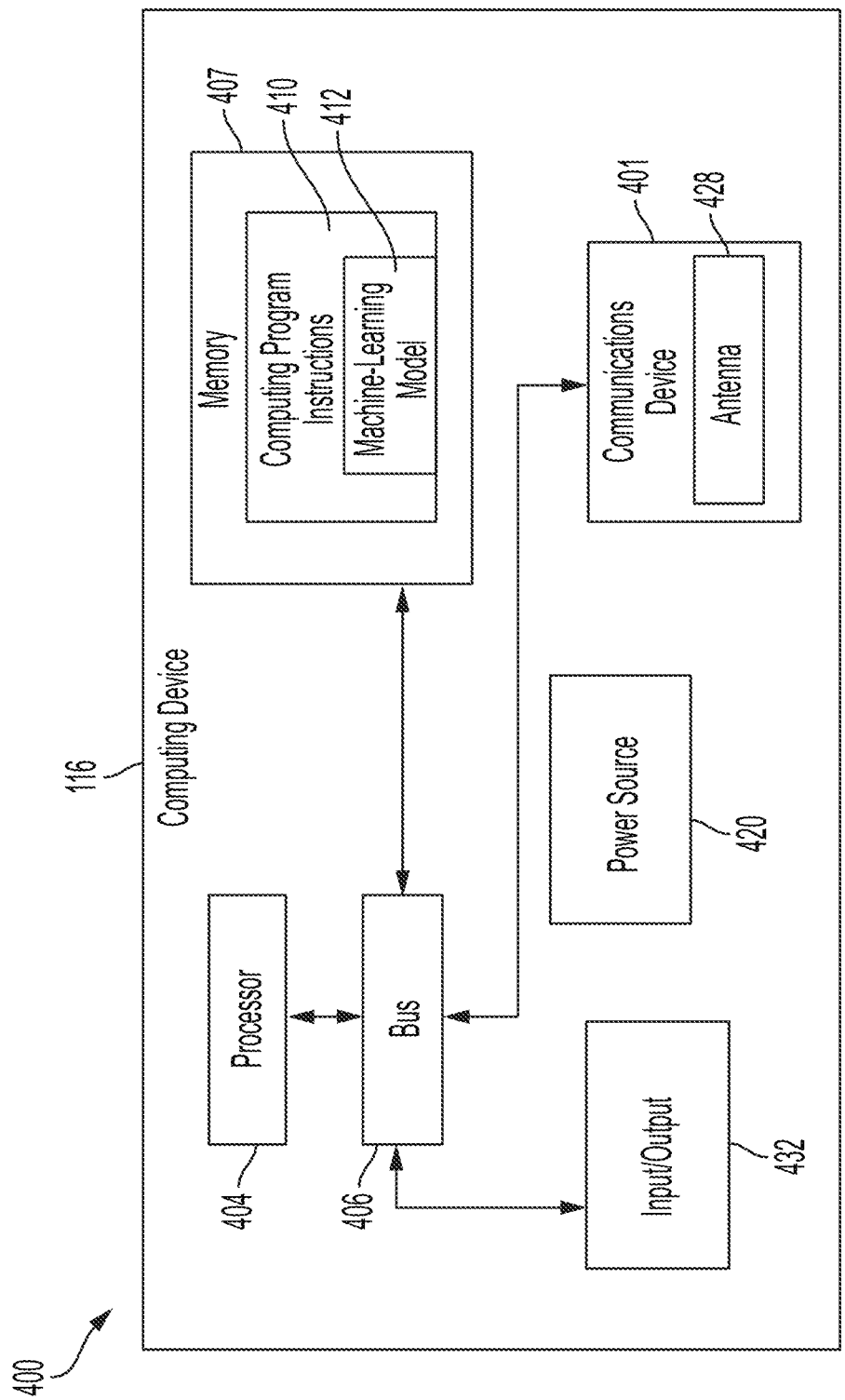
FIG. 4 is a block diagram of a computing system for determining an orientation of a flow meter device according to one example of the present disclosure.

FIG. 4 is a block diagram of a computing system 400 for determining multi-phase measurements of fluid from a wellbore 102 according to one example of the present disclosure. The components shown in FIG. 4, such as the processor 404, memory 407, power source 420, and communications device 401, etc., may be integrated into a single structure, such as within a single housing of a computing device 116. Alternatively, the components shown in FIG. 4 can be distributed from one another and in electrical communication with each other.

The computing system 400 may include the computing device 116. The computing device 116 can include the processor 404, the memory 407 (e.g., non-volatile), and a bus 406. The processor 404 can execute one or more operations for interpreting acoustic signals and determining information (e.g., fluid type, flow rate, phase ratios, etc.) relating to multi-phase fluid flowing in, or from, the wellbore 102. The processor 404 can execute instructions stored in the memory 407 to perform the operations. The processor 404 can include one processing device or multiple processing devices or cores. Non-limiting examples of the processor 404 include a Field-Programmable Gate Array ("FPGA"), an application-specific integrated circuit ("ASIC"), a microprocessor, etc.

The processor 404 can be communicatively coupled to the memory 407 via the bus 406. The memory 407 may include any type of memory device that retains stored information when powered off. Non-limiting examples of the memory 407 may include EEPROM, flash memory, or any other type of non-volatile memory. In some examples, at least part of the memory 407 can include a medium from which the processor 404 can read the instructions. A computer-readable medium can include electronic, optical, magnetic, or other storage devices capable of providing the processor 404 with computer-readable instructions or other program code. Non-limiting examples of a computer-readable medium include (but are not limited to) magnetic disk(s), memory chip(s), ROM, RAM, an ASIC, a configured processor, optical storage, or any other medium from which a computer processor can read instructions. The instructions can include processor-specific instructions generated by a compiler or an interpreter from code written in any suitable computer-programming language, including, for example, C, C++, C#, etc.

In some examples, the memory 407 can include computer program instructions 410 for generating, training, and applying a machine-learning model 412. For example, the computer program instructions 410 can include the machine-learning model 412 that is executable by the processor 404 for causing the processor 404 to determine, using orientation information about the flow meter device 128, multi-phase measurements for fluid flowing with respect to the wellbore 102. The machine-learning model 412 can be trained using historical flow data (e.g., from a reference wellbore), synthetic data, or a combination thereof. For example, the computing device 116 can receive data indicating historical flow from a reference wellbore. Additionally, the computing device 116 can generate synthetic data by generating (e.g., instead of measuring) varying types of data relating to multi-phase fluid flow. The computing device 116 can generate training data using the historical flow data and the synthetic data, and the computing device 116 can use the training data to train the machine-learning model 412 to interpret acoustic signals from or otherwise received with respect to the wellbore 102. For example, the trained machine-learning model 412 can be applied to the acoustic signals and orientation information to determine multi-phase measurements, such as flow rate, ratio of phases, type of fluid, etc., for the fluid.

The computing device can include a power source 420. The power source 420 can be in electrical communication with the computing device 116 and the communications device 401. In some examples, the power source 420 can include a battery or an electrical cable such as a wireline. The power source 420 can include an AC signal generator. The computing device 116 can operate the power source 420 to apply a transmission signal to an antenna 428 to generate electromagnetic waves that convey data relating to the orientation information, the multi-phase measurements, one or more acoustic devices 110, etc. to other systems. For example, the computing device 116 can cause the power source 420 to apply a voltage with a frequency within a specific frequency range to the antenna 428. This can cause the antenna 428 to generate a wireless transmission. In other examples, the computing device 116, rather than the power source 420, can apply the transmission signal to the antenna 428 for generating the wireless transmission.

In some examples, part of the communications device 401 can be implemented in software. For example, the communications device 401 can include additional instructions stored in memory 407 for controlling functions of the communications device 401. The communications device 401 can receive signals from remote devices and transmit data to remote devices. For example, the communications device 401 can transmit wireless communications that are modulated by data via the antenna 428. In some examples, the communications device 401 can receive signals (e.g., associated with data to be transmitted) from the processor 404 and amplify, filter, modulate, frequency shift, or otherwise manipulate the signals. In some examples, the communications device 401 can transmit the manipulated signals to the antenna 428. The antenna 428 can receive the manipulated signals and responsively generate wireless communications that carry the data.

The computing device 116 can additionally include an input/output interface 432. The input/output interface 432 can connect to a keyboard, pointing device, display, and other computer input/output devices. An operator may provide input using the input/output interface 432. Data relating to the orientation of the flow meter device 128 and fluid flow can be displayed to an operator of the wellbore 102 through a display that is connected to or is part of the input/output interface 432. Displayed values can be observed by the operator, or by a supervisor of the wellbore 102, who can make adjustments to wellbore operations based on the displayed values. Additionally or alternatively, the computing device 116 can automatically control or adjust wellbore operations based on the orientation information of the flow meter device 128 or multi-phase measurements made via an acoustic device 110.

Figure 5:
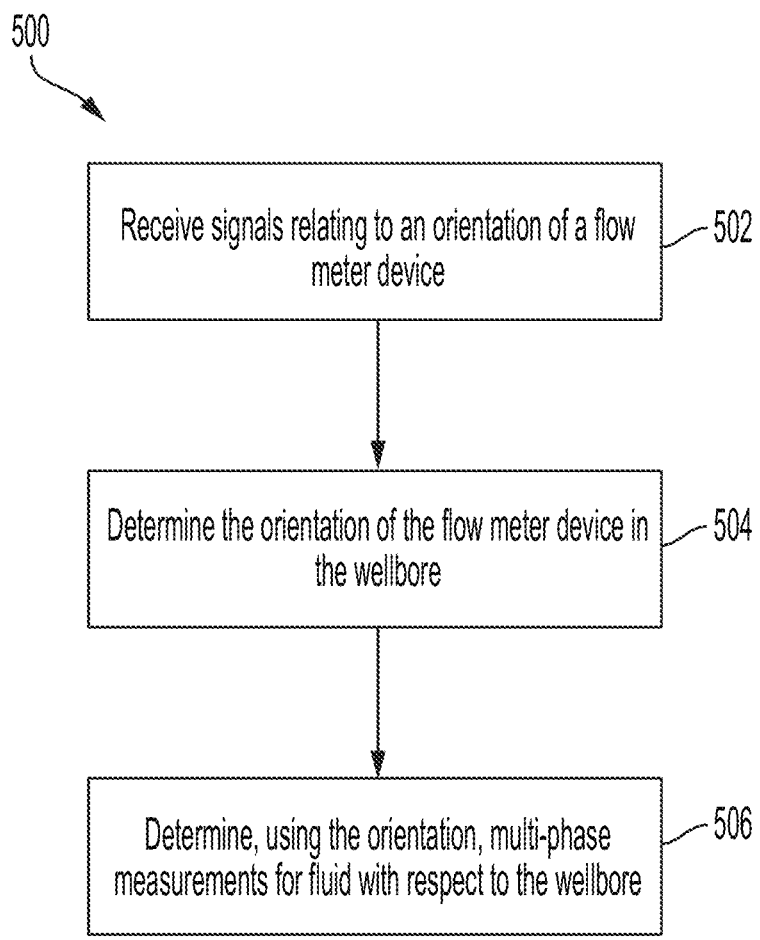
FIG. 5 is a flow chart of a process for determining an orientation of a flow meter device according to one example of the present disclosure.

FIG. 5 is a flow chart of a process 500 for determining an orientation of a flow meter device 128 according to one example of the present disclosure. The process 500 may be performed by software, firmware, hardware, other suitable entities, or a combination thereof. At block 502, signals relating to the orientation of the flow meter device 128 are received. The flow meter device 128 can be positioned in the wellbore 102 by a deployment tool (e.g., a slickline or a wireline), and measurements relating to the orientation of the flow meter device 128 can be made. In some examples, the flow meter device 128 can include an arrangement of acoustic devices 110, and the measurements relating to the orientation may indicate the arrangement of the acoustic devices 110. Additionally, the orientation of the flow meter device 128 may be similar or identical to the arrangement of the acoustic devices 110. Examples of acoustic devices can include symmetric fluidic oscillators, asymmetric fluidic oscillators, hole-tone whistles, etc.

In some examples, the flow meter device 128 can be interrogated. For example, the flow meter device 128 can be interrogated to determine or otherwise detect the acoustic signals generated by the acoustic devices 110. The flow meter device 128 can be interrogated using various suitable techniques. As one example, the flow meter device 128 can be interrogated using a DAS system via Rayleigh-based interferometry. Other suitable interrogation techniques can be used to interrogate the flow meter device 128.

At block 504, an orientation of the flow meter device 128 is determined. The orientation information received at the block 502 can indicate an orientation of the flow meter device 128 or an arrangement of the acoustic devices 110 in the flow meter device 128. In some examples, the computing device 116 can determine the orientation of the flow meter device 128. For example, the computing device 116 can receive (e.g., at the block 502) the orientation information and can use the orientation information to determine the orientation of the flow meter device 128. For example, the orientation information can include data from a three-dimensional accelerometer, a temperature sensor, other suitable data, or a combination thereof. The computing device 116 can interpret, for example using machine-learning or other suitable techniques, the orientation information to determine the orientation of the flow meter device 128, the arrangement of the acoustic devices 110, or a combination thereof.

The orientation of the flow meter device 128 can be adjusted or otherwise determined using various techniques. For example, the orientation of the flow meter device 128 can be set automatically by an alignment established at a time of deployment of the flow meter device 128. In another example, the orientation can be determined by a sensing system 117 positioned with respect to the flow meter device 128 or in other suitable locations in the wellbore 102. In another example, the orientation of the flow meter device 128 can be automatically aligned using gravitational force or other suitable forces.

At block 506, a multi-phase measurement is determined, using the orientation and acoustic signals generated by the flow meter device 128, for fluid with respect to the wellbore 102. Fluid can oscillate within the acoustic devices 110 in the flow meter device 128. The oscillating fluid may cause acoustic signals to be generated. The frequency of oscillation of the fluid may depend on various factors, such as the phase-specific fluid flow rate and fluid phase. For example, the frequency of oscillation of the fluid can be a linear function of the flow rate of the fluid. Interpreting the acoustic signals can depend on the arrangement of the acoustic devices and on the orientation of the flow meter device 128. In some examples, the multi-phase measurement can resolve phases and types of fluid present in the wellbore 102. In some examples, the orientation and the acoustic signals can be transmitted to the computing device 116. The computing device 116 can determine the multi-phase measurement. The multi-phase measurement can be used to control a wellbore operation. For example, information relating to the multi-phase measurement can be used to control or otherwise make decisions about a drilling operation, a completion operation, a stimulation operation, a production operation, any other suitable wellbore operations, or any suitable combination thereof.

Figure 6:
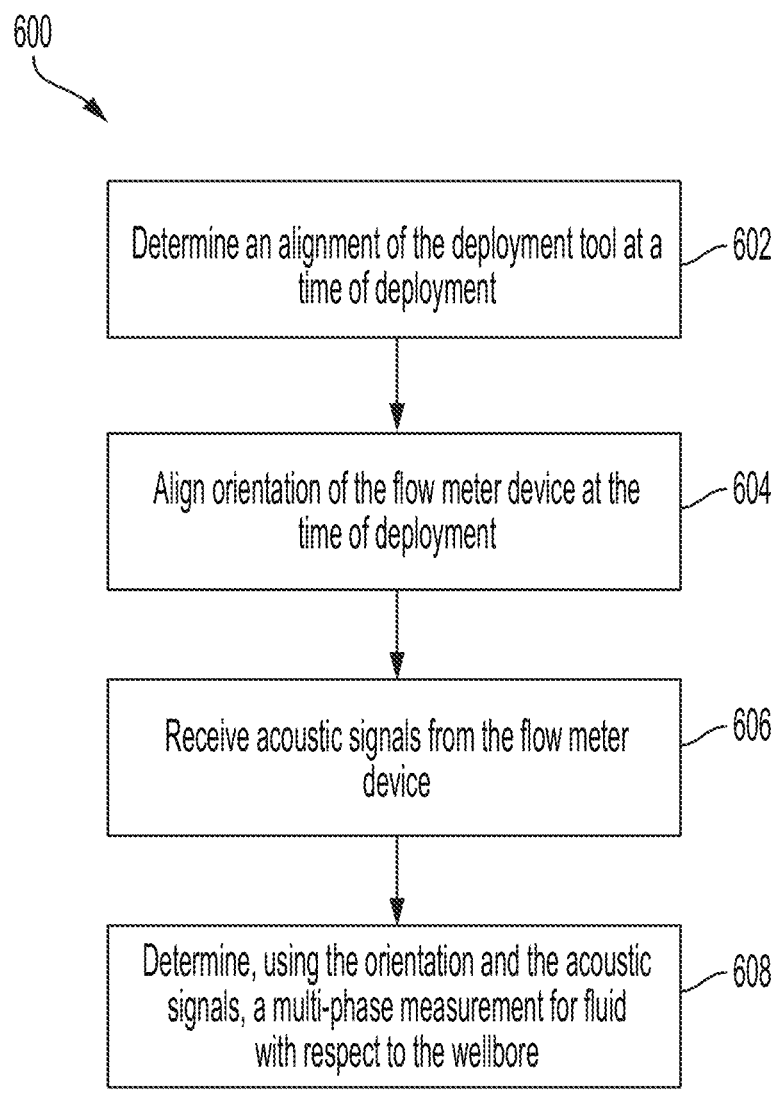
FIG. 6 is a flow chart of a process for aligning an orientation of a flow meter device during deployment according to one example of the present disclosure.

FIG. 6 is a flow chart of a process 600 for aligning an orientation of a flow meter device 128 during deployment according to one example of the present disclosure. At block 602, an alignment of a deployment tool, such as the downhole tool 122, etc., is determined at a time of deployment. The flow meter device 128 can be positioned in a wellbore 102 by the deployment tool. In some examples, during a passage of the deployment tool downhole in the wellbore 102, the alignment of the deployment tool can change. A sensor, such as an orientation detection device, in the deployment tool can determine the alignment of the deployment tool at the time of deployment of the flow meter device 128. The orientation detection device can include a three-dimensional accelerometer, a temperature sensor, other suitable sensors or detectors, or a combination thereof. The orientation detection device can determine an alignment of the deployment tool, and the orientation of the flow meter device 128 with respect to the deployment device may be known or otherwise fixed.

At block 604, the orientation of the flow meter device 128 is aligned at the time of deployment. Based on the alignment of the deployment tool, the orientation of the flow meter device 128 can be adjusted prior to releasing or otherwise deploying the flow meter device 128. The alignment of the deployment tool, and by association the orientation of the flow meter device 128, can be determined by the orientation detection device. The orientation of the flow meter device 128 can be adjusted by rotating or translating the deployment device in suitable directions. In some examples, a current or a torque through electrical motor can be measured or monitored to measure orientation of the flow meter device 128 as the flow meter device 128 is deployed. The orientation of the flow meter device 128 can be adjusted using other suitable techniques.

At block 606, acoustic signals are received from the flow meter device 128 by a computing device 116. The computing device 116 can be communicatively coupled to the sensing system 117, which can include electrical sensors, optical sensors, or other suitable sensors and can be included in or can otherwise be communicatively coupled to a DAS system or the computing device 116. In some examples, the sensing system 117 can include or otherwise be communicatively coupled to the orientation detection device. The acoustic signals from the flow meter device 128 can be generated by the arrangement of acoustic devices 110. In some examples, the acoustic signals can be transmitted by the sensing system 117 to the computing device 116. In other examples, the sensing system 117 may include the computing device 116, and the sensing system 117 may direct the acoustic signals to the computing device 116.

At block 608, a multi-phase measurement is determined, using the orientation of the flow meter device 128 and the acoustic signals, for fluid with respect to the wellbore 102. The computing device 116 can receive the acoustic signals and the orientation information relating to the flow meter device 128, which the computing device 116 can use to determine the multi-phase fluid measurements. In some examples, the multi-phase measurement can resolve phases and types of fluid present in the wellbore. The multi-phase measurement can be used to control a wellbore operation. For example, information relating to the multi-phase measurement can be used to control or otherwise make decisions about a drilling operation, a completion operation, a stimulation operation, a production operation, any other suitable wellbore operations, or any suitable combination thereof.

Figure 7:
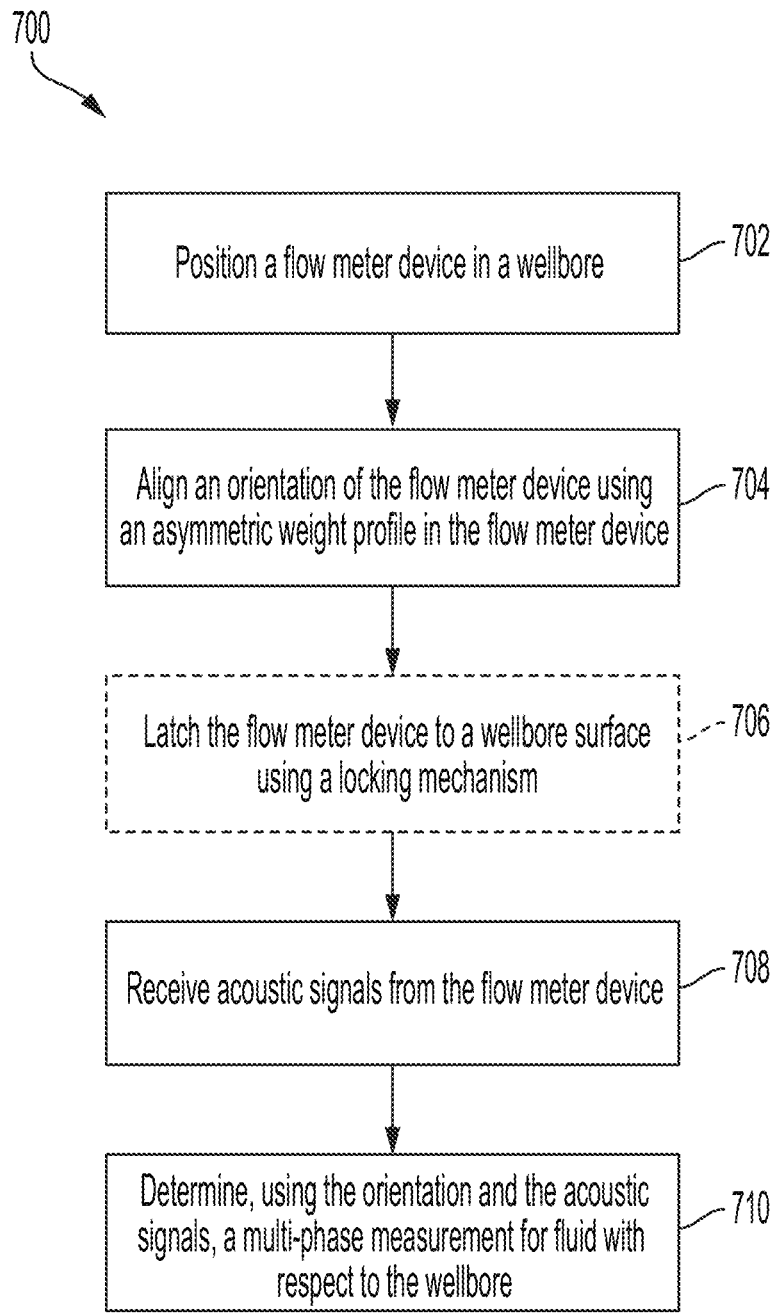
FIG. 7 is a flow chart of a process for self-aligning an orientation of a flow meter device according to one example of the present disclosure.

FIG. 7 is a flow chart of a process 700 for self-aligning an orientation of a flow meter device 128 according to one example of the present disclosure. At block 702, the flow meter device 128 is positioned in a wellbore 102. In some examples, the wellbore 102 can be a horizontal wellbore or otherwise include a substantially horizontal section. The flow meter device 128 can be positioned in the wellbore 102 by a deployment tool such as a slickline, a wireline, or other suitable deployment tool. In some examples, the flow meter device 128 can include an arrangement of acoustic devices 110 and can make multi-phase measurements relating to fluid flowing with respect to the wellbore 102.

At block 704, an orientation of the flow meter device 128 is aligned using an asymmetric weight profile in the flow meter device 128. The acoustic devices 110 may arranged such that, with an optimal orientation of the flow meter device 128, the acoustic devices 110 are arranged for making measurements of different phases of the multi-phase fluid. The flow meter device 128 can be positioned in a housing, which can include a set of bearings that can allow a gravity-based fixed alignment over time. For example, upon deployment, the flow meter device 128 may rotate or otherwise adjust its own orientation using gravitational force, and based on the asymmetric weight profile, until the optimal orientation is achieved. The flow meter device 128 may include a fixed orientation during deployment by mechanical stoppers, or other suitable components, that can dissolve in wellbore fluids.

In some examples, the flow meter device 128 can include a track and an obstacle can be positioned in the track. The track may extend around a circumference or other suitable positions with respect to the flow meter device 128. In some examples, the track may intersect or otherwise overlap a flow path that extends into one or more of the acoustic devices 110 positioned in the flow meter device 128. The obstacle can include a metallic or other suitable type of ball that can be positioned in the track to roll or otherwise readjust positioning in the track based on gravitational force to selectively block the fluid path to one or more of the acoustic devices 110. The sensing system 117 can determine the orientation of the flow meter device 128 based on disturbed frequencies generated by one or more acoustic devices 110 that are obstructed by the obstacle. In some examples, the sensing system 117 can transmit data based on the disturbed frequencies to the computing device 116, which can determine the orientation of the flow meter device 128 based on the disturbed frequencies.

At block 706, the flow meter device 128 is optionally latched to a wellbore wall using a locking mechanism. In some examples, block 706 can be done in conjunction with the techniques described with respect to the block 704. Latching can fix the orientation of the flow meter device 128, and the fixed orientation of the flow meter device 128 can be measured, for example by the orientation detection device, and transmitted to the computing device 116.

At block 708, acoustic signals from the flow meter device 128 are received by a computing device 116. In some examples, the computing device 116 can be communicatively coupled to the sensing system 117, which can include electrical sensors, optical sensors, or other suitable sensors and can be included in or can otherwise be communicatively coupled to a DAS system or the computing device 116. In some examples, the sensing system 117 can include or otherwise be communicatively coupled to the orientation detection device. The acoustic signals from the flow meter device 128 can be generated by the arrangement of acoustic devices 110. In some examples, the acoustic signals can be transmitted by the sensing system 117 to the computing device 116.

At block 710, a multi-phase measurement is determined, using the orientation and the acoustic signals, for fluid with respect to the wellbore. The computing device 116 can receive the acoustic signals and the orientation information relating to the flow meter device 128, which the computing device 116 can use to determine the multi-phase fluid measurements. In some examples, the multi-phase measurement can resolve phases and types of fluid present in the wellbore. The multi-phase measurement can be used to control a wellbore operation. For example, information relating to the multi-phase measurement can be used to control or otherwise make decisions about a drilling operation, a completion operation, a stimulation operation, a production operation, any other suitable wellbore operations, or any suitable combination thereof.

Figure 8:
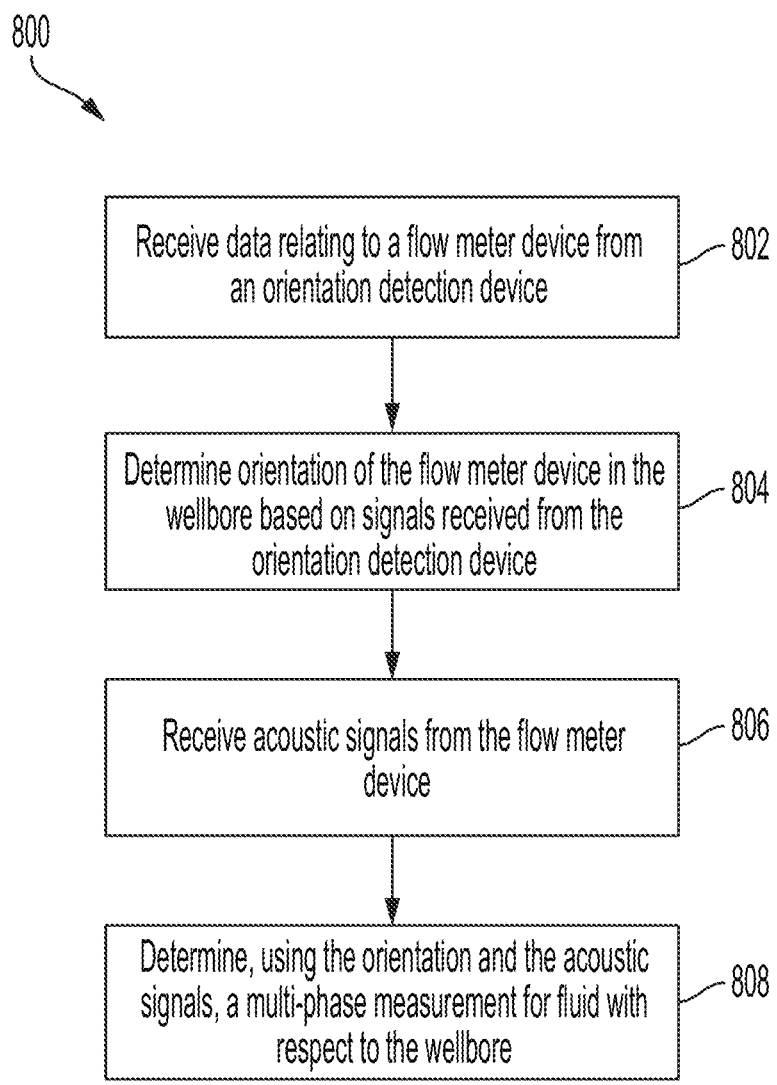
FIG. 8 is a flow chart of a process for detecting an orientation for a flow meter device with at least one sensor according to one example of the present disclosure.

FIG. 8 is a flow chart of a process 800 for detecting an orientation for a flow meter device 128 with at least one sensor according to one example of the present disclosure. At block 802, data is received from an orientation detection device. The orientation detection device can include a three-dimensional accelerometer, a temperature sensor, other suitable orientation detection devices, or any suitable combination thereof. The orientation detection device can be positioned in the flow meter device 128 for making orientation measurements relating to the flow meter device 128. The orientation detection device can be communicatively coupled (e.g., directly or indirectly) to the computing device 116, and the orientation measurements made by the orientation detection device can be transmitted to the computing device 116.

At block 804, an orientation of the flow meter device 128 in the wellbore 102 is determined based on signals received from an orientation detection device. The signals, which can include the orientation measurements, may indicate an orientation of the flow meter device 128 or an arrangement of the acoustic devices 110 positioned in the flow meter device 128. In some examples, the signals are received by an electrical sensor or optical sensor and transmitted to the computing device 116. The computing device 116 can interpret the signals to determine the orientation of the flow meter device 128. In some examples, the sensing system 117, the computing device 116, or a combination thereof can continuously measure gravity, for example via an accelerometer or other suitable sensor or device, of the flow meter device 128 to determine the orientation of the flow meter device 128.

At block 806, acoustic signals from the flow meter device 128 are received by a computing device 116. In some examples, the computing device 116 can be communicatively coupled to the sensing system 117, which can include electrical sensors, optical sensors, or other suitable sensors and can be included in or can otherwise be communicatively coupled to a DAS system or the computing device 116. In some examples, the sensing system 117 can include or otherwise be communicatively coupled to the orientation detection device. The acoustic signals from the flow meter device 128 can be generated by the arrangement of acoustic devices 110. In some examples, the acoustic signals can be transmitted by the sensing system 117 to the computing device 116.

At block 808, a multi-phase measurement is determined, using the orientation and the acoustic signals, for fluid with respect to the wellbore. The computing device 116 can receive the acoustic signals and the orientation information relating to the flow meter device 128, which the computing device 116 can use to determine the multi-phase fluid measurements. In some examples, the multi-phase measurement can resolve phases and types of fluid present in the wellbore. The multi-phase measurement can be used to control a wellbore operation. For example, information relating to the multi-phase measurement can be used to control or otherwise make decisions about a drilling operation, a completion operation, a stimulation operation, a production operation, any other suitable wellbore operations, or any suitable combination thereof.

Figure 9:
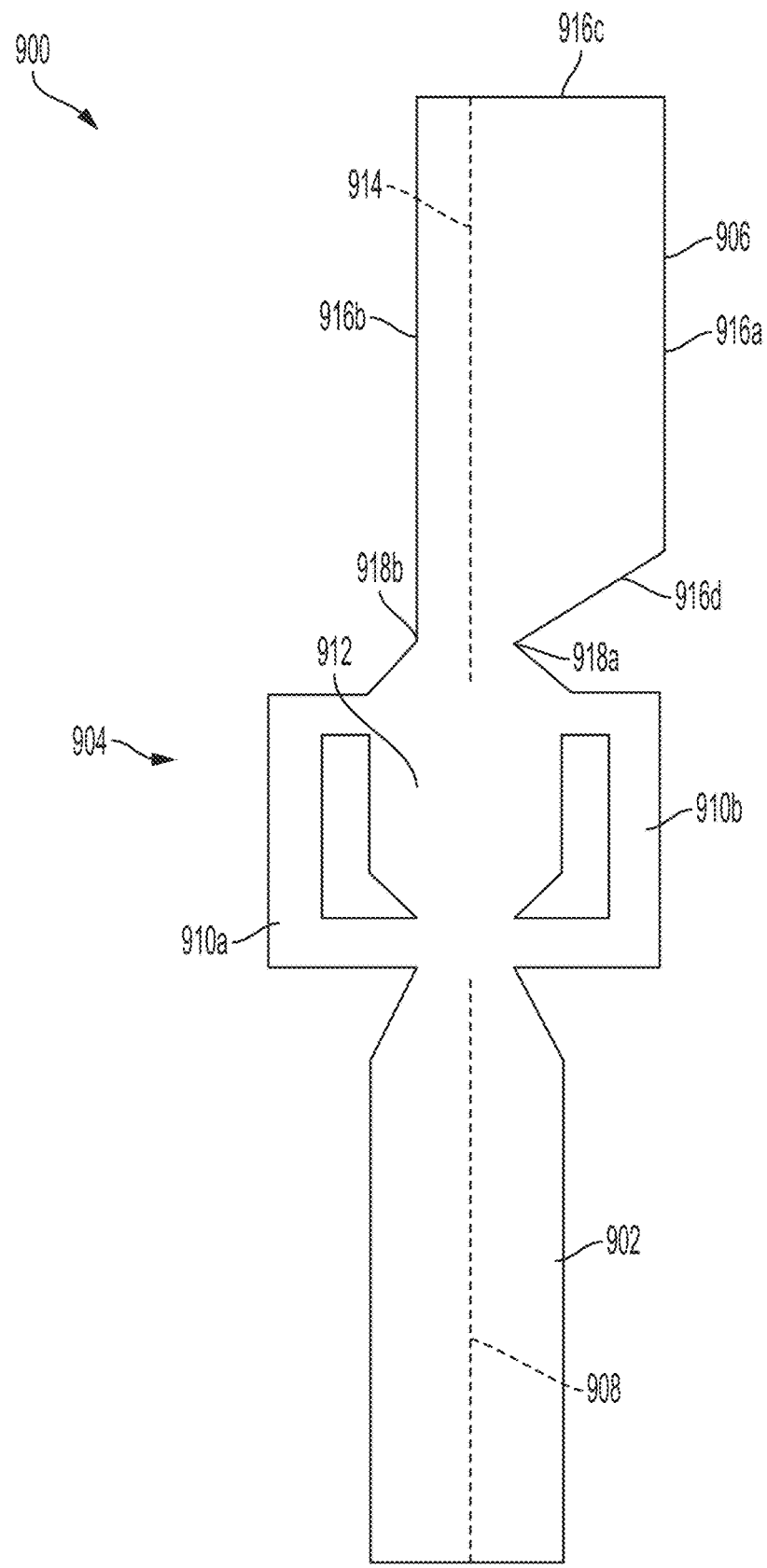
FIG. 9 is a diagram of one example of an asymmetric fluidic oscillator according to one example of the present disclosure.

FIG. 9 is a diagram of an asymmetric fluidic oscillator 900 according to one example of the present disclosure. The fluidic oscillator 900 can include an inlet channel 902, a feedback system 904, an outlet channel 906, and any other suitable components. The fluidic oscillator 900 can be included in the flow meter device 128 and may cause acoustic signals to be generated via oscillating fluid flow in the fluidic oscillator 900. The inlet channel 902 may include a receiving path in the fluidic oscillator 900. For example, the inlet channel 902 can receive fluid that may originate upstream from the fluidic oscillator 900, and the inlet channel 902 can direct the fluid further into the fluidic oscillator 900 such as into the feedback system 904. As illustrated in FIG. 9, the inlet channel 902 is symmetric about axis 908, but the inlet channel 902 may be symmetric about other suitable axes or may be asymmetric.

The feedback system 904 can be coupled to the inlet channel 902, the outlet channel 906, other suitable components, etc. The feedback system 904 can include a first feedback loop 910a, a second feedback loop 910b, a mixing chamber 912, any other suitable components, etc., and may be otherwise suitable shaped or configured. For example, the feedback system 904 can include more or fewer feedback loops 910, a differently sized or shaped mixing chamber 912, differently shaped or sized feedback loops 910, etc. for oscillating the fluid.

The outlet channel 906 can be coupled to the feedback system 904. For example, the outlet channel 906 can be coupled to the feedback loops 910a-b, the mixing chamber 912, etc. The outlet channel 906 may define an exit path for fluid received from the feedback system 904. For example, fluid may be received from the feedback system 904 by the outlet channel 906, and the outlet channel 906 may direct the fluid out of the fluidic oscillator 900.

The outlet channel 906 may be asymmetric. For example, the outlet channel 906 may not be symmetric along any suitable axes of the outlet channel 906. As illustrated, the outlet channel 906 is not symmetric about axis 914, which may be similar or identical to the axis 908 of the inlet channel 902. The asymmetric nature of the outlet channel 906 may cause disruptions or other suitable variations in flow of fluid that passes through the outlet channel 906. For example, the outlet channel 906 may interrupt the natural flow of the fluid, and the interruption may cause vibrations or other suitable acoustic signals.

The outlet channel 906 can be an irregularly shaped quadrilateral or any other suitable irregular or asymmetric shapes. The outlet channel 906 can include a right side 916a, a left side 916b, a top side 916c, and a bottom side 916d. The right side 916a may be connected to the bottom side 916d and to the top side 916c, the left side 916b may be connected to the top side 916c and to the feedback system 904, and the bottom side 916d may be connected to the feedback system 904. The right side 916a and the left side 916b may be substantially parallel to one another. In other examples, the right side 916a and the left side 916b may be non-parallel. Additionally, the top side 916c and the bottom side 916d may be non-parallel for forming the asymmetric feature of the outlet channel 906. In some examples, the asymmetric feature can be formed via the bottom side 916d coupling to the feedback system 904 in a first location 918a, while the left side 916b is coupled in a second location 918b to the feedback system 904. Accordingly, the right side 916a may be shorter than the left side 916b, and the bottom side 916d may include a defined and non-zero slope.

In some aspects, systems, methods, and non-transitory computer-readable mediums for determining an orientation of a flow meter device in a wellbore are provided according to one or more of the following examples:

As used below, any reference to a series of examples is to be understood as a reference to each of those examples disjunctively (e.g., "Examples 1-4" is to be understood as "Examples 1, 2, 3, or 4").

Example 1 is a system comprising: a flow meter device comprising one or more acoustic devices positionable in a wellbore to generate acoustic signals; and a computing device comprising: a processor; and a non-transitory computer-readable medium that includes instructions executable by the processor for causing the processor to perform operations comprising: receiving the acoustic signals from the flow meter device; determining an arrangement of the one or more acoustic devices with respect to the wellbore; and interpreting, using the arrangement of the one or more acoustic devices, the acoustic signals to make a multi-phase measurement of fluid with respect to the wellbore.

Example 2 is the system of example 1, wherein the acoustic signals are proportional to flow characteristics of one or more respective phases of the fluid that correspond to the one or more acoustic devices.

Example 3 is the system of example 1, further comprising a deployment tool, wherein the flow meter device is positionable in the wellbore using the deployment tool, and wherein the operations further comprise: receiving alignment data relating to the deployment tool during deployment of the flow meter device in the wellbore; and determining, using the alignment data, the arrangement of the one or more acoustic devices with respect to the wellbore during deployment of the flow meter device.

Example 4 is the system of example 1, wherein the flow meter device comprises an asymmetric weight profile, wherein the flow meter device is positionable in the wellbore to allow gravity-based rotation of the flow meter device for arranging the one or more acoustic devices in a predetermined arrangement, and wherein the operation of determining the arrangement of the one or more acoustic devices includes determining, using the predetermined arrangement, the arrangement of the one or more acoustic devices with respect to the wellbore and subsequent to the gravity-based rotation of the flow meter device.

Example 5 is the system of example 1, further comprising an orientation detection device positionable in the flow meter device, wherein the orientation detection device includes a three-dimensional accelerometer, and wherein the operations further comprise: receiving orientation data about the flow meter device from the orientation detection device; and determining, using the orientation data, the arrangement of the one or more acoustic devices with respect to the wellbore.

Example 6 is the system of example 1, wherein the operations further comprise: determining, using a machine-learning model, the arrangement of the one or more acoustic devices with respect to the wellbore; and determining, using the machine-learning model, the multi-phase measurement of the fluid, wherein the multi-phase measurement of the fluid includes phase-specific flow characteristics of the fluid.

Example 7 is the system of example 1, wherein the operations further comprise controlling a wellbore operation using the multi-phase measurement, wherein the wellbore operation includes a wellbore completion operation, a wellbore stimulation operation, or a wellbore production operation.

Example 8 is a method comprising: receiving, by a computing device, acoustic signals from one or more acoustic devices positioned in a flow meter device positioned in a wellbore, the one or more acoustic devices positioned to generate the acoustic signals in response to fluid flowing in the wellbore; determining, by the computing device, an arrangement of the one or more acoustic devices with respect to the wellbore; and determining, using the arrangement of the one or more acoustic devices and the acoustic signals, a multi-phase measurement for the fluid with respect to the wellbore.

Example 9 is the method of example 8, wherein the acoustic signals are proportional to flow characteristics of one or more respective phases of the fluid that correspond to the one or more acoustic devices.

Example 10 is the method of example 8, wherein the flow meter device is mechanically coupled to a deployment tool for deploying the flow meter device in the wellbore, and wherein the method further comprises: receiving, by the computing device, alignment data relating to the deployment tool during deployment of the flow meter device in the wellbore; and determining, using the alignment data, the arrangement of the one or more acoustic devices with respect to the wellbore during deployment of the flow meter device.

Example 11 is the method of example 8, wherein the flow meter device comprises an asymmetric weight profile to allow gravity-based rotation of the flow meter device for arranging the one or more acoustic devices in a predetermined arrangement, and wherein determining the arrangement of the one or more acoustic devices includes determining, using the predetermined arrangement, the arrangement of the one or more acoustic devices with respect to the wellbore and subsequent to the gravity-based rotation of the flow meter device.

Example 12 is the method of example 8, wherein the flow meter device includes an orientation detection device, wherein the orientation detection device includes a three-dimensional accelerometer, and wherein the method further comprises: receiving, by the computing device, orientation data about the flow meter device from the orientation detection device; and determining, using the orientation data, the arrangement of the one or more acoustic devices with respect to the wellbore.

Example 13 is the method of example 8, further comprising: determining, using a machine-learning model, the arrangement of the one or more acoustic devices with respect to the wellbore; and determining, using the machine-learning model, the multi-phase measurement of the fluid, wherein the multi-phase measurement of the fluid includes phase-specific flow characteristics of the fluid.

Example 14 is the method of example 8, further comprising controlling, by the computing device, a wellbore operation using the multi-phase measurement, wherein the wellbore operation includes a wellbore completion operation, a wellbore stimulation operation, or a wellbore production operation.

Example 15 is a non-transitory computer-readable medium comprising instructions that are executable by a processor for causing the processor to perform operations comprising: receiving acoustic signals from a flow meter device that comprises one or more acoustic devices positionable to generate the acoustic signals in a wellbore; determining an arrangement of the one or more acoustic devices with respect to the wellbore; and interpreting, using the arrangement of the one or more acoustic devices, the acoustic signals to make a multi-phase measurement of fluid with respect to the wellbore.

Example 16 is the non-transitory computer-readable medium of example wherein the acoustic signals are proportional to flow characteristics of one or more respective phases of the fluid that correspond to the one or more acoustic devices.

Example 17 is the non-transitory computer-readable medium of example wherein the flow meter device is positionable in the wellbore using a deployment tool, and wherein the operations further comprise: receiving alignment data relating to the deployment tool during deployment of the flow meter device in the wellbore; and determining, using the alignment data, the arrangement of the one or more acoustic devices with respect to the wellbore during deployment of the flow meter device.

Example 18 is the non-transitory computer-readable medium of example wherein the flow meter device comprises an asymmetric weight profile, wherein the flow meter device is positionable in the wellbore to allow gravity-based rotation of the flow meter device for arranging the one or more acoustic devices in a predetermined arrangement, and wherein the operation of determining the arrangement of the one or more acoustic devices includes determining, using the predetermined arrangement, the arrangement of the one or more acoustic devices with respect to the wellbore and subsequent to the gravity-based rotation of the flow meter device.

Example 19 is the non-transitory computer-readable medium of example wherein the flow meter device comprises an orientation detection device, wherein the orientation detection device includes a three-dimensional accelerometer, and wherein the operations further comprise: receiving orientation data about the flow meter device from the orientation detection device; and determining, using the orientation data, the arrangement of the one or more acoustic devices with respect to the wellbore.

Example 20 is the non-transitory computer-readable medium of example wherein the operations further comprise: determining, using a machine-learning model, the arrangement of the one or more acoustic devices with respect to the wellbore; and determining, using the machine-learning model, the multi-phase measurement of the fluid, wherein the multi-phase measurement of the fluid includes phase-specific flow characteristics of the fluid.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure.

What is claimed is:

1. A system comprising:
a flow meter device comprising one or more acoustic devices positionable in a wellbore to generate acoustic signals; and
a computing device comprising:
a processor; and
a non-transitory computer-readable medium that includes instructions executable by the processor for causing the processor to perform operations comprising:
receiving the acoustic signals and physical orientation information from the flow meter device;
determining, using the physical orientation information, an arrangement of the one or more acoustic devices with respect to the wellbore, wherein the arrangement of the one or more acoustic devices comprises relative physical three-dimensional locations for each acoustic device of the one or more acoustic devices; and
interpreting, using the arrangement of the one or more acoustic devices, the acoustic signals to make a multi-phase measurement of fluid with respect to the wellbore.

2. The system of claim 1, wherein the acoustic signals are proportional to flow characteristics of one or more respective phases of the fluid that correspond to the one or more acoustic devices.

3. The system of claim 1, further comprising a deployment tool, wherein the flow meter device is positionable in the wellbore using the deployment tool, and wherein the operations further comprise:
receiving alignment data relating to the deployment tool during deployment of the flow meter device in the wellbore; and
determining, using the alignment data, the arrangement of the one or more acoustic devices with respect to the wellbore during deployment of the flow meter device.

4. The system of claim 1, wherein the flow meter device comprises an asymmetric weight profile, wherein the flow meter device is positionable in the wellbore to allow gravity-based rotation of the flow meter device for arranging the one or more acoustic devices in a predetermined arrangement, and wherein the operation of determining the arrangement of the one or more acoustic devices includes determining, using the predetermined arrangement, the arrangement of the one or more acoustic devices with respect to the wellbore and subsequent to the gravity-based rotation of the flow meter device.

5. The system of claim 1, further comprising an orientation detection device positionable in the flow meter device, wherein the orientation detection device includes a three-dimensional accelerometer, and wherein the operations further comprise:
receiving orientation data about the flow meter device from the orientation detection device; and
determining, using the orientation data, the arrangement of the one or more acoustic devices with respect to the wellbore.

6. The system of claim 1, wherein the operations further comprise:
determining, using a machine-learning model, the arrangement of the one or more acoustic devices with respect to the wellbore; and
determining, using the machine-learning model, the multi-phase measurement of the fluid, wherein the multi-phase measurement of the fluid includes phase-specific flow characteristics of the fluid.

7. A method comprising:
receiving, by a computing device, acoustic signals and physical orientation information from one or more acoustic devices positioned in a flow meter device positioned in a wellbore, the one or more acoustic devices positioned to generate the acoustic signals in response to fluid flowing in the wellbore;
determining, by the computing device and by using the physical orientation information, an arrangement of the one or more acoustic devices with respect to the wellbore, wherein the arrangement of the one or more acoustic devices comprises relative physical three-dimensional locations for each acoustic device of the one or more acoustic devices; and
determining, using the arrangement of the one or more acoustic devices and the acoustic signals, a multi-phase measurement for the fluid with respect to the wellbore.

8. The method of claim 7, wherein the acoustic signals are proportional to flow characteristics of one or more respective phases of the fluid that correspond to the one or more acoustic devices.

9. The method of claim 7, wherein the flow meter device is mechanically coupled to a deployment tool for deploying the flow meter device in the wellbore, and wherein the method further comprises:
receiving, by the computing device, alignment data relating to the deployment tool during deployment of the flow meter device in the wellbore; and
determining, using the alignment data, the arrangement of the one or more acoustic devices with respect to the wellbore during deployment of the flow meter device.

10. The method of claim 7, wherein the flow meter device comprises an asymmetric weight profile to allow gravity-based rotation of the flow meter device for arranging the one or more acoustic devices in a predetermined arrangement, and wherein determining the arrangement of the one or more acoustic devices includes determining, using the predetermined arrangement, the arrangement of the one or more acoustic devices with respect to the wellbore and subsequent to the gravity-based rotation of the flow meter device.

11. The method of claim 7, wherein the flow meter device includes an orientation detection device, wherein the orientation detection device includes a three-dimensional accelerometer, and wherein the method further comprises:
receiving, by the computing device, orientation data about the flow meter device from the orientation detection device; and
determining, using the orientation data, the arrangement of the one or more acoustic devices with respect to the wellbore.

12. The method of claim 7, further comprising:
determining, using a machine-learning model, the arrangement of the one or more acoustic devices with respect to the wellbore; and
determining, using the machine-learning model, the multi-phase measurement of the fluid, wherein the multi-phase measurement of the fluid includes phase-specific flow characteristics of the fluid.

13. The method of claim 7, further comprising controlling, by the computing device, a wellbore operation using the multi-phase measurement, wherein the wellbore operation includes a wellbore completion operation, a wellbore stimulation operation, or a wellbore production operation.

14. A non-transitory computer-readable medium comprising instructions that are executable by a processor for causing the processor to perform operations comprising:
receiving acoustic signals and physical orientation information from a flow meter device that comprises one or more acoustic devices positionable to generate the acoustic signals in a wellbore;
determining, using the physical orientation information, an arrangement of the one or more acoustic devices with respect to the wellbore, wherein the arrangement of the one or more acoustic devices comprises relative physical three-dimensional locations for each acoustic device of the one or more acoustic devices; and
interpreting, using the arrangement of the one or more acoustic devices, the acoustic signals to make a multi-phase measurement of fluid with respect to the wellbore.

15. The non-transitory computer-readable medium of claim 14, wherein the acoustic signals are proportional to flow characteristics of one or more respective phases of the fluid that correspond to the one or more acoustic devices.

16. The non-transitory computer-readable medium of claim 14, wherein the flow meter device is positionable in the wellbore using a deployment tool, and wherein the operations further comprise:
receiving alignment data relating to the deployment tool during deployment of the flow meter device in the wellbore; and
determining, using the alignment data, the arrangement of the one or more acoustic devices with respect to the wellbore during deployment of the flow meter device.

17. The non-transitory computer-readable medium of claim 14, wherein the flow meter device comprises an asymmetric weight profile, wherein the flow meter device is positionable in the wellbore to allow gravity-based rotation of the flow meter device for arranging the one or more acoustic devices in a predetermined arrangement, and wherein the operation of determining the arrangement of the one or more acoustic devices includes determining, using the predetermined arrangement, the arrangement of the one or more acoustic devices with respect to the wellbore and subsequent to the gravity-based rotation of the flow meter device.

18. The non-transitory computer-readable medium of claim 14, wherein the flow meter device comprises an orientation detection device, wherein the orientation detection device includes a three-dimensional accelerometer, and wherein the operations further comprise:
receiving orientation data about the flow meter device from the orientation detection device; and
determining, using the orientation data, the arrangement of the one or more acoustic devices with respect to the wellbore.

19. The non-transitory computer-readable medium of claim 14, wherein the operations further comprise:
determining, using a machine-learning model, the arrangement of the one or more acoustic devices with respect to the wellbore; and
determining, using the machine-learning model, the multi-phase measurement of the fluid, wherein the multi-phase measurement of the fluid includes phase-specific flow characteristics of the fluid.

* * * * *